United States Patent
Wiese et al.

(10) Patent No.: US 7,128,057 B2
(45) Date of Patent: Oct. 31, 2006

(54) DEVICE FOR DETERMINING FUEL QUALITY AND CORRESPONDING METHOD

(75) Inventors: Matthias Wiese, Frankfurt am Main (DE); Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/511,393

(22) PCT Filed: Apr. 9, 2003

(86) PCT No.: PCT/DE03/01168

§ 371 (c)(1),
(2), (4) Date: Oct. 15, 2004

(87) PCT Pub. No.: WO03/087560

PCT Pub. Date: Oct. 23, 2003

(65) Prior Publication Data

US 2005/0224055 A1  Oct. 13, 2005

(30) Foreign Application Priority Data

Apr. 18, 2002  (DE) ................. 102 17 379

(51) Int. Cl.
*F02D 41/00* (2006.01)
*F02M 37/00* (2006.01)

(52) U.S. Cl. ..................................... 123/494

(58) Field of Classification Search ............ 123/1 A, 123/494, 575

See application file for complete search history.

(56) References Cited

U.S. PATENT DOCUMENTS

| | | | |
|---|---|---|---|
| 5,878,727 A * | 3/1999 | Huls | 123/520 |
| 6,109,225 A | 8/2000 | Ogita et al. | 123/90.15 |
| 6,314,944 B1 | 11/2001 | Majima | 123/491 |
| 6,494,190 B1 * | 12/2002 | Cohen | 123/575 |
| 2001/0003977 A1 * | 6/2001 | Hayashi et al. | 123/480 |

FOREIGN PATENT DOCUMENTS

| | | |
|---|---|---|
| DE | 40 27 947 A1 | 3/1992 |
| DE | 100 14 550 A1 | 10/2001 |
| JP | 090 72252 | 3/1997 |

* cited by examiner

*Primary Examiner*—T. M. Argenbright
(74) *Attorney, Agent, or Firm*—Morrison & Foerster LLP

(57) ABSTRACT

The invention relates to a device for determining the quality of fuel for an internal combustion engine, comprising a pressure sensor (1) for determining the pressure (p) inside a fuel tank and/or comprising a temperature sensor (4) for determining the temperature (T) inside a fuel tank. According to the invention, an evaluation unit (5) is provided for determining a quality value (Q), which depicts die quality of the fuel, based on the temperature (T) and/or the pressure (p) inside the fuel tank. Said evaluation unit is connected on the input side to the pressure sensor (1) and/or to the temperature sensor (4).

9 Claims, 3 Drawing Sheets

DEVICE FOR DETERMINING FUEL QUALITY AND CORRESPONDING METHOD

CLAIM FOR PRIORITY

This application is a national stage of PCT/DE03/01168, published in the German language on Apr. 9, 2003, which claims the benefit of priority to German Application No. DE 102 17 379.6, filed on Apr. 18, 2002.

TECHNICAL FIELD OF THE INVENTION

The invention relates to a device for determining the quality of fuel for an internal combustion engine.

BACKGROUND OF THE INVENTION

The quality of the fuel used to drive internal combustion engines may be subject to manufacturing tolerances, for example the fuel may contain varying proportions of long-chain hydrocarbons.

It is therefore a well-known procedure to determine the quality of the fuel used and to take this into account in the fuel injection process in order to compensate for the quality variations as far as possible.

At present, variations in fuel quality are detected using a starting-quantity adaptation technique or the uneven-running method, and compensated for by varying the injection periods. In these known methods, the increase in speed when starting the internal combustion engine or the speed variations at start-up are evaluated. If the increase in speed or the speed variations lies/lie outside an allowed preset confidence band the injection period is corrected accordingly. The correction amount is calculated relatively imprecisely, however, so that sometimes the correction proves too great. In particular, given a "poor start", the injection period is changed so as to make the fuel-air mixture richer, which means that the fuel-air mixture may be too rich after filling up with a very good quality fuel. As a result, the internal combustion engine starts badly or not at all.

Another disadvantage of this method for determining the fuel quality is the relatively low accuracy, because the increase in speed when starting the internal combustion engine does not depend solely on the fuel quality but is also affected by other parameters such as the internal friction of the internal combustion engine.

DE 40 27 947 A1 describes various ways in which one can take into account fuel quality variations. One way is to measure the control deviation in the lambda control circuit after each tank fill of the vehicle driven by the internal combustion engine, and to vary an adaptation value so as to reduce the control deviation to zero. This method has the disadvantage that it only works when the lambda control system is enabled. This is specifically not the case, however, when the internal combustion engine is cold. Other methods are proposed that ensure that, even when the internal combustion engine is cold, the internal combustion engine is still able to run when the fuel composition changes sharply at tank fill-up, for instance when a tank containing fuel is practically emptied and then filled with a fuel containing mainly methanol. Using the tank levels before and after tank fill, an assessment is made of what sort of fuel compositions can be present on the basis of commercial fuel data. The input control values are then modified for running the internal combustion engine using fuels of the possible compositions, and the system assesses which composition the internal combustion engine runs best with. These values are used from then on for controlling the internal combustion engine.

The disadvantage of these known methods for determining the fuel quality, however, is that they are coupled with the combustion process and hence may also be affected by other parameters.

SUMMARY OF THE INVENTION

The invention relates to device for determining the quality of a fuel independently of the combustion process and a corresponding method for determining the fuel quality.

The invention is based on the technical knowledge that the fuel quality can be assessed from its gas emission behavior. For instance a fuel containing a high proportion of long-chain hydrocarbons has a weaker gas emission than a fuel containing a high proportion of short-chain hydrocarbons, because long-chain hydrocarbons are less volatile. The gas emission behavior of the fuel therefore reflects the long-chain and short-chain hydrocarbon composition of the fuel and hence the fuel quality.

It is therefore provided within the invention to measure the pressure and/or temperature in a fuel container in order to derive from this a quality value that represents the fuel quality.

The pressure or temperature in the fuel container is preferably measured by a separate pressure sensor or temperature sensor respectively. Alternatively, however, the pressure and/or temperature in the fuel container may be derived from other measured values, avoiding the need for a separate pressure and/or temperature sensor. The term used in the context of the invention for a pressure and/or temperature sensor should therefore be understood as a general term covering all arrangements in which the pressure and/or the temperature in the fuel container is measured directly or indirectly. For example, the temperature sensor may also measure the fuel temperature in the low-pressure section of the injection system in order to derive the fuel temperature in the fuel container.

In addition, the device according to the invention contains an evaluation unit whose inputs are connected to the temperature sensor and/or the pressure sensor, and which determines the quality value as a function of the pressure and/or temperature in the fuel container.

The evaluation unit preferably contains two processing units, where the first processing unit is connected to the pressure sensor and the temperature sensor and determines a gas emission characteristic value representing the gas emission behavior of the fuel as a function of the pressure and temperature in the fuel container.

The second processing unit then determines the quality value of the fuel on the basis of the gas emission characteristic value, the gas emission characteristic value preferably being linked to the quality-value according to a functional relationship. The second processing unit may also store this functional relationship in the form of a table.

The evaluation unit preferably contains a differentiator which determines the rate of change in pressure in the fuel container. The term differentiator, however, should be understood in its general sense in the context of the patent, and covers not only differentiation in the narrow mathematical sense, but also components or sub-assemblies that measure the rate of change in pressure.

In the preferred embodiment of the invention, a comparator unit is also provided, which compares the rate of change in pressure in the fuel container with a preset threshold value. This procedure is based on the knowledge that the gas emission behavior of the fuel is highly temperature-dependent and exhibits an abrupt change at a specific threshold temperature. In fact when the temperature exceeds the threshold temperature, the fuel gas emission increases abruptly, which accordingly causes an abrupt rise in pressure in the fuel container when the fuel warms up. In the opposite situation, during cooling, the pressure in the fuel container drops abruptly when the temperature falls below the threshold temperature.

Thus in order to be able to determine the threshold temperature as the gas emission characteristic value, the preset threshold value for the change in pressure preferably equals the change in pressure at the preset threshold temperature.

Finally, in the preferred embodiment of the invention, a sample-and-hold device is provided, which is triggered by the comparator unit to store temporarily the temperature currently measured in the fuel container when the current change in pressure in the fuel container exceeds the preset threshold value. In this way the sample-and-hold device always holds the threshold temperature at which the fuel abruptly changes its gas emission behavior.

The method according to the invention for determining the fuel quality can also be implemented as a computer program, for instance by suitable modification of the control program in the electronic control unit of an injection system. The device according to the invention can accordingly be fully integrated in the electronic control unit of an injection system.

It is also possible, however, to design the device according to the invention as a separate sub-assembly, which can then be connected via data lines to the electronic control unit of the injection system.

In addition, it should be mentioned that the method according to the invention can be implemented both after the internal combustion engine is switched off when the fuel is cooling and while the internal combustion engine is running when the fuel is warming up. The only crucial factor is that the gas emission behavior of the fuel in the fuel container varies according to the temperature, which enables an assessment of the fuel composition.

An advantage of the device according to the invention and the corresponding method is the relatively low cost, because conventional injection systems usually already have a temperature sensor for measuring the fuel temperature.

BRIEF DESCRIPTION OF THE DRAWINGS

Further advantages of the present invention will be described with reference to the following figures in which.

DETAILED DESCRIPTION OF THE INVENTION

Figure 1:
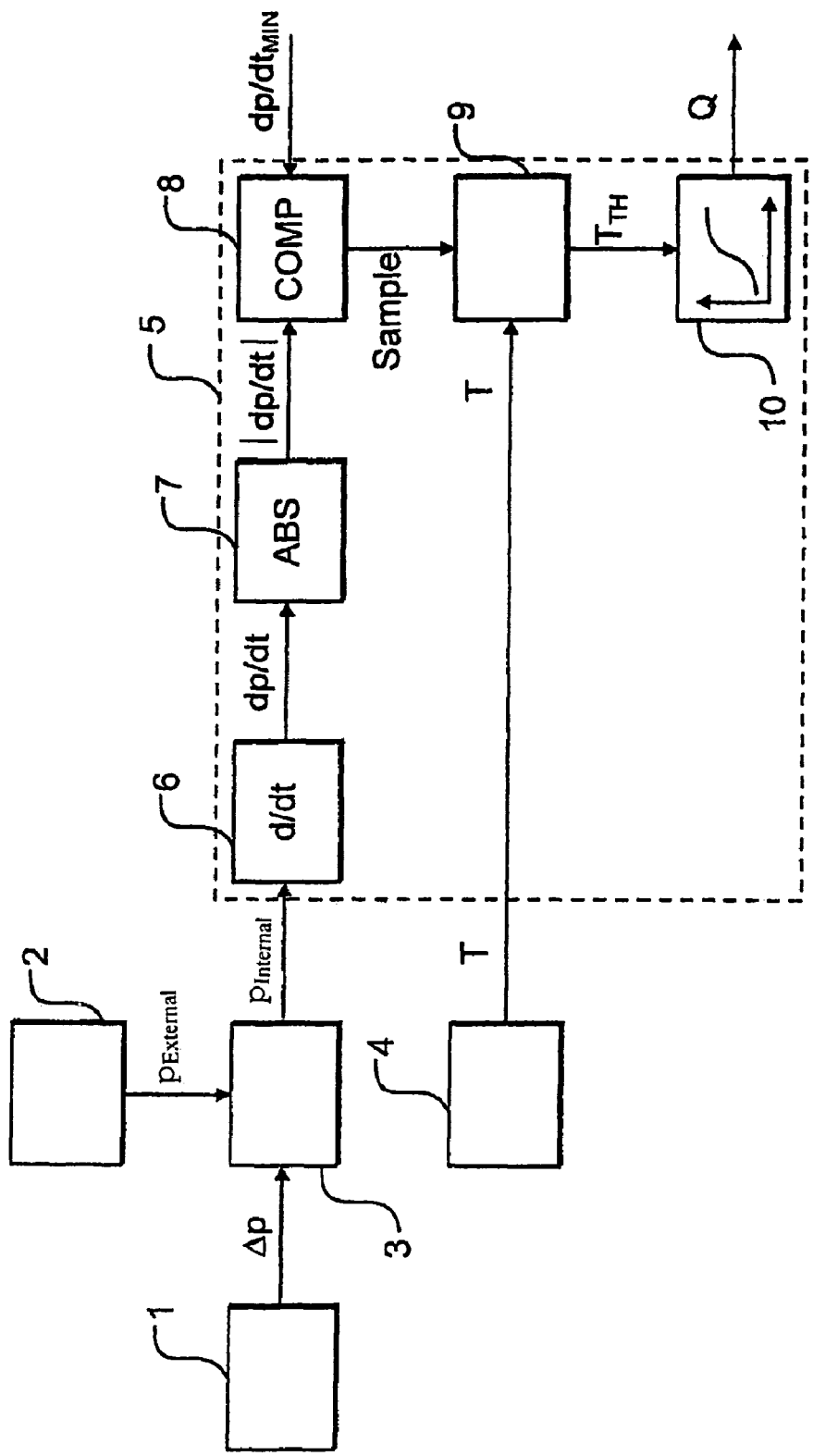
FIG. 1 shows a device according to the invention for determining the fuel quality.

The device according to the invention shown in FIG. 1 is used for determining the quality of the fuel in a fuel container of an internal combustion engine and enables the determined fuel quality to be taken into account when running the internal combustion engine, for example by controlling an injection system accordingly.

The determination of the fuel quality according to the invention is based on the knowledge that the gas emission behavior of the fuel depends on the fuel quality, because long-chain hydrocarbons have a weaker gas emission than short-chain hydrocarbons. For a standard composition of the fuel containing a defined proportion of long-chain and short-chain hydrocarbons, the fuel therefore has a defined gas emission behavior, while deviations in the fuel composition from the standard are associated with a modified gas emission behavior.

The gas emission behavior of the fuel is in this case measured on the basis of the fuel held in the fuel container, the fuel container being closed off during the measurement so that the fuel gas emissions result in a measurable pressure change.

Thus the device according to the invention contains a pressure sensor 1, which is arranged in the wall of the fuel container and measures the pressure difference $\Delta p$ between the internal pressure $p_{Internal}$ in the fuel container and the ambient pressure $p_{External}$.

In addition, another pressure sensor 2 is provided, which measures the ambient pressure $p_{External}$ so that altitude or weather-related changes in the ambient pressure $p_{External}$ can be taken into account. The pressure sensor 2 may be a conventional sensor in the narrower sense, but it is also possible for the ambient pressure $p_{External}$ to be derived from other measured values.

The outputs of the two pressure sensors 1, 2 are connected to a processing unit 3, which calculates the internal pressure $p_{Internal}$ in the fuel container from the pressure difference $\Delta p$ and the ambient pressure $p_{External}$.

The gas emission behavior of the fuel does not depend solely on the long-chain and short-chain hydrocarbon composition of the fuel however, but also on the fuel temperature, because as the fuel temperature increases more gas is emitted by the fuel, leading to a corresponding increase in pressure.

The device according to the invention therefore additionally contains a temperature sensor 4, which is also arranged in the wall of the fuel container and measures the fuel temperature.

The outputs of the processing unit 3 and the temperature sensor 4 are connected to an evaluation unit 5, which determines a quality value Q representing the fuel quality from the measured values for pressure p and temperature T.

The evaluation unit 5 contains a processing unit 6 for this purpose, which determines the rate of change dp/dt in the pressure difference p measured by the pressure sensor 1.

Figure 3A:
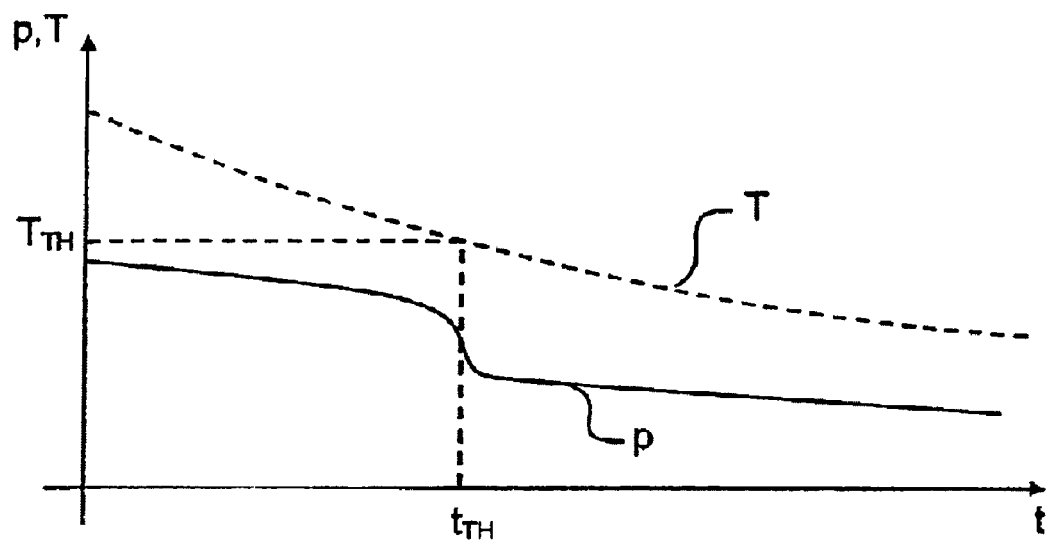
FIGS. 3a and 3b show a cooling and heating curve for the fuel.

The output of the processing unit 6 is connected to a further processing unit 7, which determines the absolute value of the rate of change in pressure. This is necessary because the rate of change in pressure dp/dt is negative when the fuel is cooling after switching off the internal combustion engine, as shown in FIG. 3a. In contrast, the rate of change in pressure dp/dt is positive when measured after starting up the internal combustion engine, as shown in FIG. 3b.

The output of the processing unit 7 is connected to a comparator unit 8, which compares the absolute value of the rate of change in pressure dp/dt with a preset threshold value $dt/dt_{MIN}$.

Figure 3B:
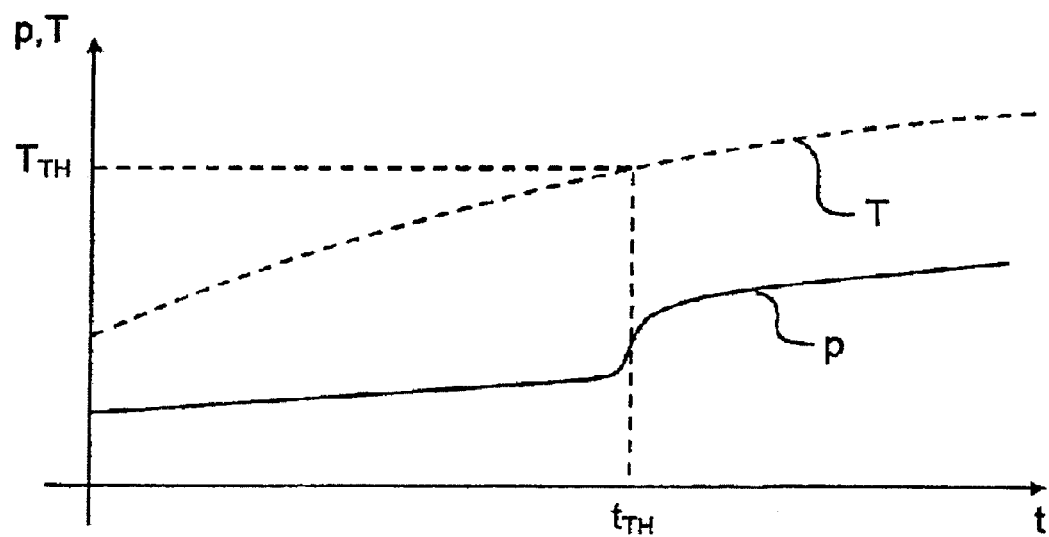

This makes use of the knowledge that the fuel gas emission behavior is highly temperature-dependent, which results in an abrupt pressure change at a specific threshold temperature $T_{TH}$, as can be seen in FIGS. 3a and 3b. In this case the preset threshold value $dp/dt_{MIN}$ is substantially equal to the rate of change in pressure at the threshold temperature $T_{TH}$, so that the comparator unit 8 enables the threshold temperature $T_{TH}$ to be determined.

The threshold temperature $T_{TH}$ is not constant, however, but depends on the fuel composition and reflects the gas emission behavior of the fuel. A low threshold value $T_{TH}$ is an indicator of a highly volatile fuel containing a high proportion of short-chain hydrocarbons. A high threshold value $T_{TH}$, on the other hand, results from a high proportion of long-chain hydrocarbons, which means that the fuel is less volatile. The threshold value $T_{TH}$ is hence a gas emission characteristic value that reflects the gas emission behavior of the fuel.

Depending on the comparison result, the comparator unit 8 triggers a sample-and-hold device 9, whose input is connected to the temperature sensor 4. If the rate of change in pressure dp/dt exceeds the preset threshold value $dp/dt_{MIN}$, the sample-and-hold circuit 9 accepts and stores as the threshold temperature $T_{TH}$ the temperature T currently being measured. Otherwise the sample-and-hold device 9 retains the previously measured value for the threshold temperature $T_{TH}$.

Finally, the sample-and-hold device 9 is connected to a processing unit 10, which calculates the quality value Q representing the fuel quality from the stored gas emission characteristic value $T_{TH}$. The quality value is calculated according to a defined functional relationship, which is saved in the form of a table in the processing unit 10.

An injection system for an internal combustion engine can then take into account the quality value Q determined by the device according to the invention in order to compensate for the effects of a varying fuel quality.

Figure 2:
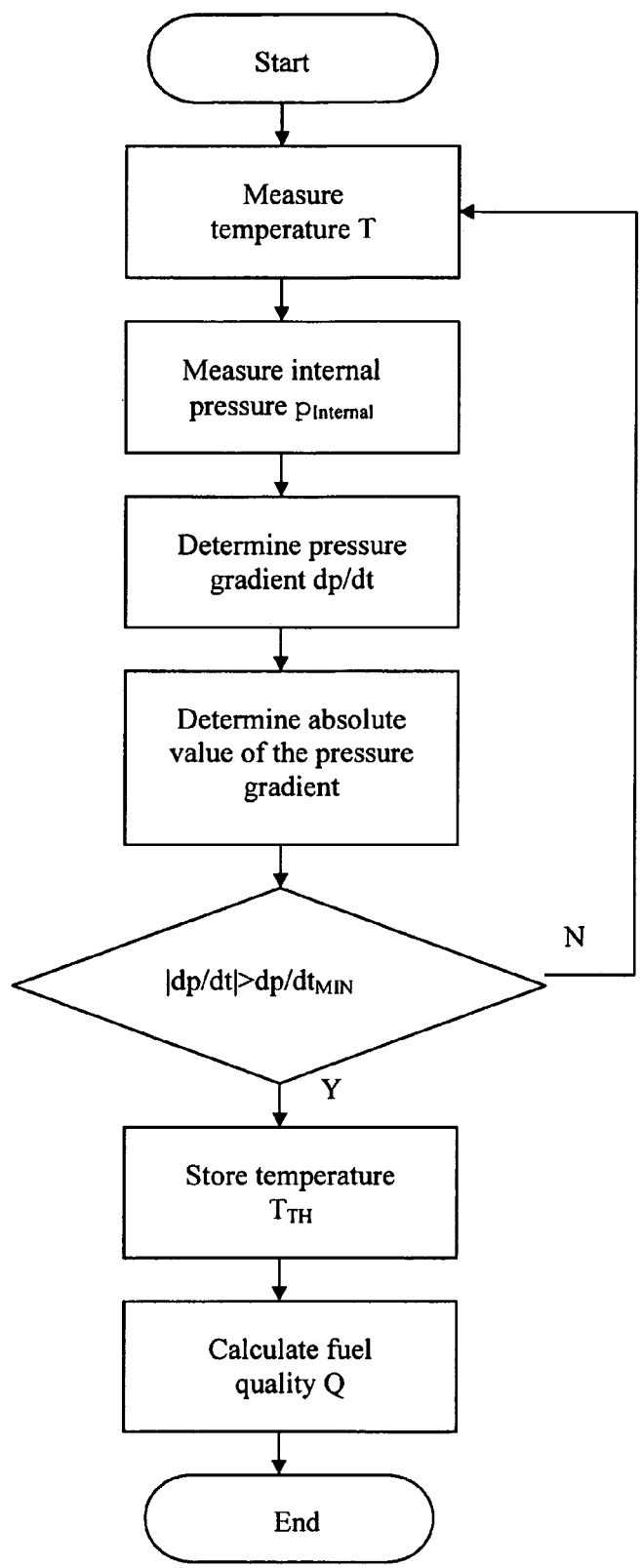
FIG. 2 shows the operating method of the device of FIG. 1 as a flow diagram.

The method according to the invention is described below with reference to the flow diagram shown in FIG. 2.

After the start, the temperature T and the internal pressure $p_{Internal}$ in the fuel container of the internal combustion engine are measured continuously in a loop.

The pressure gradient dp/dt is also calculated continuously and the absolute value of the pressure gradient determined continuously.

The absolute value of the pressure gradient is then compared continuously with the preset threshold value $dp/dt_{MIN}$, this being the rate of change in pressure that occurs during the abrupt change in the fuel gas emission behavior at the threshold temperature $T_{TH}$, corresponding to the time $t_{TH}$ in FIGS. 3a and 3b.

If the pressure gradient dp/dt exceeds the preset threshold value $dp/dt_{MIN}$, the current temperature T is stored as the threshold temperature $T_{TH}$. Otherwise the process continues in the loop until the current pressure gradient dp/dt exceeds the threshold value $dp/dt_{MIN}$.

In a final step, the quality value Q representing the fuel quality is then calculated from the stored threshold temperature $T_{TH}$ according to a defined functional relationship. The injection system can then take into account this quality value Q in order to compensate for the effect of a varying fuel quality.

The method according to the invention described above works both as the fuel is cooling after switching off the internal combustion engine and when the engine is running with the fuel warming up slowly.

FIG. 3a shows the behavior of the temperature T and the pressure p in the fuel container as the fuel cools after switching off the internal combustion engine, when the temperature T declines exponentially. The pressure p also follows the downward temperature curve, but the pressure curve exhibits an abrupt drop at the time $t_{TH}$, when the temperature falls below the threshold temperature $t_{TH}$. The reason for this is that the fuel gas emission behavior is highly temperature-dependent and emission sets in at the threshold temperature $T_{TH}$. The threshold temperature $T_{TH}$ thus constitutes a gas emission characteristic value representing the gas emission behavior of the fuel.

FIG. 3b, on the other hand, shows the behavior of the temperature T and the pressure p in the fuel container after starting up the internal combustion engine, when the fuel temperature T increases exponentially. The pressure p in the fuel container also increases with the temperature, and exhibits an abrupt rise when the temperature exceeds the threshold temperature $T_{TH}$. The reason for this is that the fuel gas emission behavior increases abruptly when the threshold temperature $T_{TH}$ is exceeded, so that the threshold temperature $T_{TH}$ constitutes a gas emission characteristic value representing the fuel gas emission behavior that is not temperature-dependent.

The invention is not restricted to the exemplary embodiment described above, but one can think of a multiplicity of variations and modifications that also make use of the idea of the invention and hence fall within the scope of protection.

What is claimed is:

1. A device for determining the quality of fuel for an internal combustion engine, comprising:
   a pressure sensor for measuring the pressure in a fuel container;
   a temperature sensor for measuring the temperature in a fuel container; and
   an evaluation unit with inputs that are connected to the pressure sensor and the temperature sensor, for determining a quality value representing the fuel quality, wherein the evaluation unit determines the quality value as a function of the temperature and the pressure in the fuel container in that the evaluation unit, derives the quality value therefrom,
   wherein the evaluation unit comprises a first processing unit which has inputs that are connected to the pressure sensor and the temperature sensor and which determines, as a function of the pressure and temperature in the fuel container, a gas emission characteristic value representing the gas emission behavior of the fuel, and
   the evaluation unit comprises a second processing unit which has an input that is connected to the first processing unit and which determines the quality value of the fuel as a function of the gas emission characteristic value, wherein
   the first processing unit comprises a differentiator which determines the rate of change in the pressure in the fuel container.

2. The device as claimed in claim 1, wherein the first processing unit comprises a comparator unit which has inputs that are connected to the differentiator and which compares the rate of change in pressure in the fuel container with a preset threshold value.

3. The device as claimed in claim 2, wherein the evaluation unit comprises a sample-and-hold device having a sampling input and a control input, the sampling input being connected to the temperature sensor, while the control input is connected to the comparator unit.

4. A method for determining the quality of fuel for an internal combustion engine, comprising:
   measuring pressure and/or temperature in a fuel container, while the fuel is in a fuel container;

determining a quality value representing the fuel quality, wherein the quality value is determined as a function of the measured temperature and the measured pressure in the fuel container in that the quality value is derived therefrom;

determining a gas emission characteristic value, representing the gas emission behavior of the fuel as a function of the temperature and the pressure in the fuel container;

determining the quality value of the fuel as a function of the gas emission characteristic value determined for the fuel;

determining the rate of change in pressure in the fuel container; and determining the gas emission characteristic value as a function of the rate of change in pressure in the fuel container.

5. The method as claimed in claim 4, further comprising:

comparison of the rate of change in pressure in the fuel container with a preset threshold value; and determining the gas emission characteristic value as the temperature in the fuel container at which the preset threshold value for the change in pressure is reached or exceeded.

6. The method as claimed in claim 4, wherein the fuel container is closed off during measurement of the pressure and the temperature.

7. The method as claimed in claim 6, wherein the fuel container has tank ventilation that is shut off during measurement of the pressure in the fuel container.

8. The method as claimed in claim 4, wherein the internal combustion engine is switched off during measurement of the pressure in the fuel container.

9. The method as claimed in claim 4, wherein the fuel is injected into a combustion chamber of an internal combustion engine as a function of the quality value.

* * * * *